United States Patent [19]
Peters, Jr.

[11] 3,777,094
[45] Dec. 4, 1973

[54] THERMALLY INSULATED COOKWARE FOR DYNAMIC INDUCTION FIELD HEATING AND COOKING APPARATUS

[75] Inventor: Philip H. Peters, Jr., Greenwich, N.Y.

[73] Assignee: Environment/One Corporation, Schenectady, N.Y.

[22] Filed: Sept. 9, 1971

[21] Appl. No.: 179,010

[52] U.S. Cl............ 219/10.49, 126/390, 219/10.79, 220/63
[51] Int. Cl. ............................................. H05b 5/08
[58] Field of Search...................... 219/10.49, 10.51; 13/27; 220/9 F, 63, 64, 55 D, 55 E, 55 F, 55 G, 94; 126/390

[56] References Cited
UNITED STATES PATENTS

| | | | |
|---|---|---|---|
| 3,294,946 | 12/1966 | Baermann | 219/10.49 |
| 1,992,515 | 2/1935 | Uhlmann | 219/10.49 |
| 1,508,452 | 9/1924 | Harrington | 219/10.49 |
| 3,350,494 | 10/1967 | Kunitsky et al. | 219/10.49 X |
| 3,078,006 | 2/1963 | Price et al. | 220/64 |
| 180,485 | 8/1876 | Manning | 220/64 |
| 3,599,575 | 8/1971 | Yurkoski et al. | 220/9 F |
| 2,586,759 | 2/1952 | Zimmer | 220/94 |
| 2,033,855 | 3/1936 | Sloan | 220/64 |
| 3,035,143 | 5/1962 | Leatherman | 219/10.77 |
| 2,625,242 | 1/1953 | Reed | 219/10.49 X |
| 932,242 | 8/1909 | Berry | 219/10.49 |
| 3,530,499 | 9/1970 | Schroeder | 219/10.49 |

Primary Examiner—Bruce A. Reynolds
Attorney—Charles W. Helzer

[57] ABSTRACT

Thermally insulated cookware for use with dynamic induction field heating and cooking apparatus comprising a cooking utensil formed from an inner body member of metal susceptible to being inductively heated with high frequency magnetic induction fields. At least one exterior layer of thermally insulating material of high temperature plastic, ceramic, high temperature glass or the like is formed over substantially the entire exterior surface including the bottom of the inner metallic body member and comprises an insulating material that is substantially transparent to magnetic lines of flux. The inner metallic body member may comprise stainless steel, iron, titanium, porcelainized iron or steel, or the like and the exterior insulating covering may be a high temperature polyimid or polycarbonate plastic high temperature foam with a hardened exterior surface of plastic, a ceramic, a high temperature glass or the like. A window area preferably is formed in the exterior insulating coating which is transparent to infrared radiation rays for allowing an infrared responsive temperature sensor to view the temperature of the inner metallic body member during cooking and thereafter function to control this temperature at predetermined set levels. The exterior insulating surface preferably is formed with an attractive design providing asthetic appeal to the cookware and a lid may be provided for the cookware which also comprises an inner metallic member and an outer insulating member that allows foods contained within the cookware to be substantially surrounded by high temperature cooking surfaces which are insulated from the exterior. As a consequence, food may be maintained warm for substantially longer periods of time and very little heat loss takes place during the cooking process.

13 Claims, 2 Drawing Figures

PATENTED DEC 4 1973  3,777,094

Inventor
Philip H. Peters, Jr.
by Charles W. Helzer
His Attorney 3,777,094

THERMALLY INSULATED COOKWARE FOR DYNAMIC INDUCTION FIELD HEATING AND COOKING APPARATUS

BACKGROUND OF THE INVENTION

1. Field of the Invention

This invention relates to new and improved thermally insulated metal-base cookware.

More paticularly, the invention relates to new and improved, thermally insulated cookware suitable for use with dynamic, high frequency, magnetic induction field heating and cooking apparatus.

2. Background of Invention

In U.S. application Ser. No. 131,648 (HD-5043), filed April 6, 1971, now U.S. Pat. No. 3710062,— Philip H. Peters, Jr. —Inventor, Entitled "Metal Base Cookware Induction Heating Apparatus Having Improved Power Supply And Gating Control Circuit Using Infrared Temperature Sensor And Improved Induction Heating Coil Arrangement" and assigned to the Environment/One Corportion, a dynamic, high frequency, magnetic induction field cooking and heating device as described together with suitable power conversion, power control and temperature control circuitry for exciting metal-base cookware with high frequency, magnetic induction fields. While this device is capable of use with any metal-base cookware which is susceptible to being heated with high frequency, magnetic induction fields, its greatest efficiency and usefulness is attained while used in connection with thermally insulated cookware comprising the present invention.

The increase in efficiency and usefulness obtained with the dynamic, high frequency, magnetic induction field heating and cooking apparatus when used with the present invention, is obtained due to the thermal insulating characteristics of the cookware comprising the present invention. The thermal insulating cookware substantially reduces back heating of the smooth, normally cool cooking surface of the dynamic, high frequency magnetic induction field heating and cooking apparatus thereby reducing heat loss, and further allows food cooked in the thermally insulated cookware to stay warm after being cooked for greater periods of time, and allows food to be maintained in a warm condition at considerably reduced power consumption levels.

SUMMARY OF INVENTION

It is therefore a primary purpose of this invention to provide new and improved thermally insulated cookware for use with dynamic, high frequency, magnetic induction field cooking and heating apparatus.

In practicing the invention thermally insulated cookware is provided which comprises a cooking utensil formed from an inner body member of metal susceptible to being inductively heated with high frequency magnetic induction fields, and at least one exterior layer of thermally insulating material formed over substantially the entire exterior surface including the bottom of the inner metallic body member and comprising an insulating material that is substantially transparent to magnetic lines of flux. The inner metallic body member may comprise stainless steel, iron, titanium, porcelainized iron or steel and the like, and the exterior insulating surface may be formed of a high temperature polyimid or polycarbonate plastic high temperature foam provided with an outer temperature-hardened surface of plastic, a ceramic, a high temperature glass and the like. In certain embodiments, a window area is formed in the exterior insulating circuit (preferably on the bottom) which is transparent to infrared radiation and allows an infrared responsive temperature sensor to view the temperature of the inner metallic body member for temperature sensing and temperature control purposes. In preferred forms of the invention, the cookware includes a lid that likewise is comprised of an inner metallic member formed of a metal susceptible to being inductively heated with high frequency magnetic induction field, and at least one exterior layer of insulating material formed over substantially the entire exterior surface of the lid and substantially transparent to magnetic lines of flux. The cookware when used with the lid substantially surrounds food contained within the cookware with heated metallic cooking surfaces that provide improved cooking efficiency and further serves to maintain food that has been cooked in a warm condition for prolonged periods of time. Additionally, with such an arrangement is possible to maintain foods in a warm condition with substantially reduced input power levels over prolonged periods of time. If desired the exterior surface of the insulating material may be provided with an attractive design giving the cookware asthetic appeal and either permanent or removable handles may be secured to the cookware to facilitate its handling during the cooking process. Additional embodiments of the thermally insulated cookware are also described.

BRIEF DESCRIPTION OF THE DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENTS

For a more detailed description of the construction and operation of a dynamic, high frequency, magnetic induction field heating and cooking apparatus, reference is made to the above-identified copending United States patent application. For the purpose of the present disclosure, it is sufficient to describe briefly the operating characteristics of the dynamic, magnetic induction heating and cooking apparatus, however, The apparatus is designed to produce a relatively high frequency magentic field that acts on the free atoms and other current carriers in a metal-base cookware to cause these atoms and other free carriers to be agitated at the frequency of the dynamic magnetic field which may be on the order of 20 kilohertz, for example. At this relatively high frequency, the excitation of the atoms and other free current carriers in the surface of the metal-base cookware causes the temperature of the surface of the metal-base cookware to rise rapidly to temperature levels determined primarily by the strength of the magnetic induction field. By controlling the power level at which the magnetic induction field cooking and heating apparatus operates, the resultant temperature to which the metal-base pan or other cookware is heated, can be controlled. In the above-noted copending U.S. application such an apparatus is described along with a preferred construction for the magnetic induction field producing coil over which a metal-base cookware is disposed, the power conversion circuitry, the power control circuitry, and temperature control circuit for regulating the actual temperature of the metal-base cookware itself. Thus, it will be appreciated that with the dynamic magnetic field induction heating and cooking apparatus it is possible to control to an extremely fine degree the actual temperature of the metal-base cookware with which a cooking operation is being performed.

Figure 1:
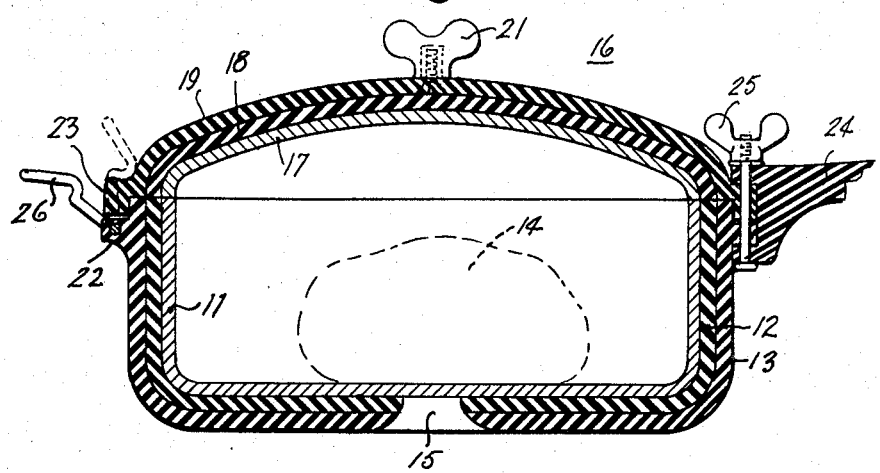
FIG. 1 is a cross-sectional view taken through the handle of one embodiment of new and improved thermally insulated cookware constructed in accordance with the invention, and illustrates thermally insulated cookware which also includes a thermally insulated lid.

FIG. 1 illustrates one form of a preferred, thermally insulated, metal-base cookware constructed in accordance with the invention and which is intended primarily for use with the above-briefly described dynamic, magnetic induction field heating and cooking apparatus. The thermally insulated cookware shown in FIG. 1 is comprised by an inner body member 11 formed of a metal which is susceptible to being inductively heated with high frequency magnetic induction fields. The metal may comprise stainless steel, titanium, iron, suitable alloys of these materials, other similar metal materials such as porcelainized iron and steel having the desired capability of being inductively heated with high frequency magnetic induction fields. The inner, metallic body member 11 may first be shaped in a desired form for the cookware such as a fry pan, roasting pan, pot, tea kettle, coffee pot, etc. having any of the well-known forms of cooking utensils that have long been used by the housewife. For this purpose, any of the known stamping, drawing, molding, etc. techniques in providing the desired shape to the metallic, inner body member 11 may be employed.

In one preferred form of the thermally insulated cookware, titanium is used in forming the metallic inner body member since titanium is readily heated by a magnetic induction field and has several other advantages. To be particular, titanium is lighter than stainless steel and resists corrosion as well, and although it is a bit more expensive than good stainless steel, it is very strong and a sturdy utensil can be made from fairly thin sheet stock in order to keep both the weight and the cost of the resultant cookware down. The uniform heating characteristics of the dynamic, magnetic induction field heating and cooking apparatus avoids the development of hot spots in the metallic inner body member so that relatively thin stock material can be used in forming the metallic inner body member whether it be of titanium, stainless steel, etc. For example, if titanium is employed to form the metallic, inner body member, sheet stock of about 0.03 inch thickness can be employed in fabricating the inner body member in a suitable stamping dye if the sheet stock and stamping dye are heated to a temperature of around 300° C. Where the titanium is about as workable as stainless steel at room temperatures. Alternatively, electrohydraulic or magnetic shaping and forming processes can be employed to form the inner metallic body member by shock wave impact, etc. If desired, the inner surface, at least, of the inner body member 11 if it is formed from titanium, can be treated in a vacuum or inert gas such as argon to obtain an extremely hard surface resistant to denting, nicking, scratching or other undesired effects which are common to other forms of cookware. The vacuum or inert gas treatment might also serve to create a crystalline surface in the titanium which is of attractive appearance. Corresponding treatments can be provided for metallic inner body members fabricated from stainless steel, iron, etc. to provide similar effects.

Following formation of the metallic, inner body member 11, an outer insulating jacket is disposed over the exterior surface including the bottom of the metallic inner body member. This insulating jacket, in the embodiment shown in FIG. 1 is comprised by a first inner layer of insulating material 12 which may be a high temperature plastic foam such as a high temperature plastic foam suitably secured to the exterior surface of the inner metallic body member 11 by a high temperature epoxy resin or other suitable adhesive. The insulating layer 12 has formed over it either integrally or again by adhering with a high temperature epoxy resin, a hard plastic outer lining 13 formed from a high temperature abrasion resistant polyimid or polycarbonate plastic, or other similar material having comparable characteristics, and possibly including glass cloth laminations impregnated with such plastic materials. It is essential that both the inner and outer insulating layers 12 and 13 be comprised of insulating materials that are substantially transparent to magnetic lines of flux so that they do not substantially reduce the field strength of the magnetic lines of flux acting on the metallic inner body member and causing it to heat and thereby cook objects such as shown at 14 contained within the thermally insulated cookware.

In order to determine the temperature at which the object 14 is being cooked, a window opening or aperture 15 is provided in the exterior insulating layers 12 and 13 so as to allow infrared heat radiation emanating from the surface of the metallic inner body member 11 to pass through and to impinge upon an infrared heat temperature sensor comprising a part of the power and temperature controls used in controlling the operation of the dynamic magnetic induction field heating and cooking apparatus as described more fully in the above-mentioned copending U.S. application Ser. No. 131,648 (HD-5043). The window opening 15 preferably is formed in the bottom surface of the exterior insulating layers 12 and 13 and may constitute nothing more than a void which exposes the bottom surface of the metallic inner body member 11 to the air. Alternatively, the window opening 15 may be filled with a suitable high temperature insulating material which is transparent to infrared radiation such as a pyroceramic or quartz. It is, of course, possible to locate the window opening 15 at some point other than the bottom; however, the opening must correspond with the positioning of the infrared temperature sensor used in temperature controlling the temperature to which the cookware is being heated.

To complete the thermally insulated cookware for certain kinds of roasting pans, etc. it is desirable to provide a thermally insulated lid shown generally at 16 and likewise comprising an inner, metallic lid member 17, a first compressible, high temperature plastic liner 18 and an outer, high temperature, hard surface plastic layer 19 all of which may correspond substantially to the layers 11, 12 and 13, respectively, forming the body portion of the cookware. A suitable insulating handle shown at 21 may be provided to the lid 16 to facilitate its placement and removal.

The cookware shown in FIG. 1 preferably is provided with an outer rim or flange portion shown at 22 surrounding the circumference of the cookware and coacting with a corresponding rim or flange portion 23 formed on the lid 16. At one point on the periphery, a removable handle shown at 24 and preferably of insulating material is secured over the coating rim or flange portions 22 and 23 by means of a suitable spring biased butterfly nut and bolt arrangement 25 for removably securing the handle 24 over the coacting rim of flange portions 22 and 23. Additonally, suitable U-shaped clamps formed of a high temperature spring metal copper or aluminum clad to minimize heating of the clamps, or of high temperature fiber glass such as shown at 26. may be secured at a number of different points around the periphery of the cookware and coacting lid 16 to hold the lid 16 snugly in place over the body of the cookware. When thus assembled, it will be seen that the object 14 being cooked is surrounded on substantially all sides by an inner, metallic, conductive lining which through the action of the high frequency, magnetic induction fields, is heated to a high temperature which depends upon the magnitude of the field which couples to the conductive lining of both the pan and the lid. It will be further observed that with the thermally insulated cookware of the invention, substantially all of this heat is directed internally where it is effective in cooking the food or other object 14 being processed. By reason of the exterior insulating layers, very little heat loss takes place to the surrounding atmosphere in which the cooking operation is being conducted. Thus, heat losses are maintained at an absolute minimum, while maximizing the effective application of the heat to the food or other object 14 being cooked. Consequently, the overall heat loss to the environment (such as a kitchen) where the cooking operation is being conducted, is very small. Food cooked in such a pan with thelid in place would remain warm for hours, and further where it is desired to use the thermally insulated cookware for maintaining food in a warm condition, only a minimum consumption of warming power would be required because of the substantially reduced heat losses to the atmosphere. During such warming operations, not only is the heat loss reduced to a minimum but it will be noted that moisture will not be driven out of the food to the same extent as with current warming techniques and cookware. Conventional pressurized cooking is easily done with such a utensil.

In addition to the above-described highly desirable characteristics, it should be noted that the dynamic, magnetic induction field cooking and heating apparatus with which the cookware is to be used, is designed to employ a substantially smooth cooking surface which is insulating in nature and which has disposed under it the necessary magnetic field producing, flat helically wound, induction coil. The advantages to be obtained by a housewife in maintaining the flat, substantially continuous cooking surfaces clean, are believed obvious, and need not be expounded further. It is a characteristic of the arrangement, however, that heat induced in a metal-base cookware with the magnetic induction field heating and cooking apparatus, will backheat the insulating cooking top surface. With the present invention, it will be noted that the amount of backheat transmitted from the inner metallic body member 11 through the exterior insulating surface will be substantially reduced. Because of this characteristic, it then becomes possible to employ as the cooktop surfaces rather ordinary surface materials such as phenolics known commercially as BAKELITE and TEXTOLITE and the like for use as the insulating cooking surface disposed between the induction heating coil and the bottom of the cookware. This will allow a whole new dimension in appliance design of dynamic magnetic induction heating and cooking apparatus with respect to the insulating materials used in forming the smooth cooktop surface. It should be further noted, that even with cooking units which employ insulating, smooth cooktop surfaces made of insulating materials that will withstand high temperatures, the backheating from a thermally insulated pan of the type herein described will be much less than that from a metal-base cookware which is not thermally insulated, and is in direct contact with the smooth, insulating cooking surface disposed between the induction heating coil and the metal-base pan. As an example, after food has been cooking in an induction heated, uninsulated metal-base pan for say 15 to 20 minutes at a temperature of 375° F., the surface directly beneath the pan will have acquired a temperature close to that of the pan bottom. In contrast, if the cookware is thermally insulated in the manner taught by the present invention, the temperature of the underlying cooking surface due to backheating will be much lower than that of the pan bottom, perhaps only 150° F. Therefore, it is far less likely that a person who happened to touch the smooth, insulating cook surface immediately after a pan has been removed, in the region where the pan had been resting, would be burned where thermally insulated cookware of the type herein described is employed.

Figure 2:
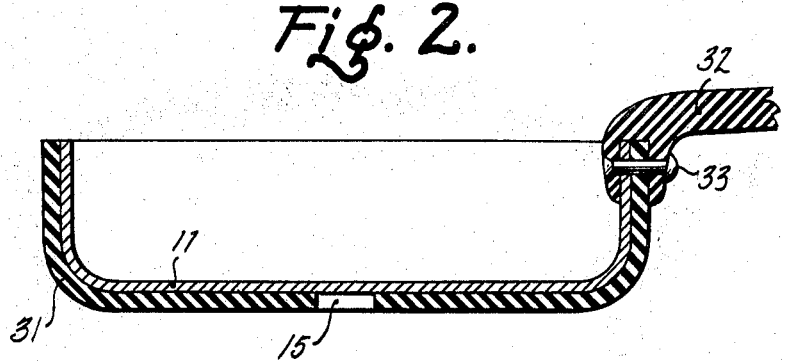
FIG. 2 is a cross-sectional view taken through the handle of a second form of thermally insulated cookware constructed in accordance with the invention.

FIG. 2 of the drawings illustrates still another form of thermally insulated cookware constructed in accordance with the invention. The thermally insulated cookware shown in FIG. 2 is designed primarily for use as a frying pan and is comprised by an inner, metallic, body member 11 of stainless steel, titanium, iron, porcelainized iron or steel, etc. Formed over the exterior surface of the inner, metallic body member 11, is an exterior insulating layer 31 which may comprise a ceramic, high temperature polyimid or polycarbonate plastic and the like secured to the inner metallic body member 11 by suitable known bonding techniques such as titanium hydride bonding techniques, plasma heated ceramic or plastic spraying, electrophoretic deposition, and high temperature adhesive bonding, etc. Again, it is desirable to provide a window area 15 in the bottom exterior surface of the insulating layer 31 to allow infrared radiation from the inner metallic body member 11 to pass directly to the top of the induction range cooking surface and thence to an infrared radiation responsive temperature sensor comprising a part of the temperature control of the magnetic induction field cooking and heating apparatus. Also it is essential that the insulating layer of ceramic, high temperature glass, etc. be transparent to magnetic induction fields so as not to substantially reduce the induction heating effect on the inner metallic body member 11.

If desired, a suitable lid of corresponding construction can be provided for the thermally insulated cookware of FIG. 2 and it may be provided with a removable handle such as that shown in FIG. 1 or may have a permanently secured handle such as that shown at 32 secured to the cookware by rivets 33 or the like. Here again, it will be appreciated that because of the exterior, thermal insulation characteristics, heat loss to the surrounding environment (kitchen air) is maintained at a minimum, and substantially all heat induced in the inner, metallic body member 11 is transferred to the food or other object being cooked. Further, backheating of the underlying insulating cooking surface is maintained at a minimum.

In addition to all of the above-recited, desirable characteristics, it should be further noted, that the thermally insulated cookware of the present invention makes possible entirely new arrangements for decorating kitchens and in the storage and handling of cookware. In fabricating the thermally insulating cookware, it is possible to provide attractive designs and coloring to the exterior insulating surfaces by well-known means so that the storage of such cookware on hooks, shelves and other places for visible viewing, and as an addition to the decor of the kitchen area, or the like, becomes not only possible, but desirable from an asthetic point of view.

From the foregoing description, it will be appreciated that the invention provides new and improved, thermally insulated cookware which substantially reduces heat lost to the environment, backheating of a cooking surface and greatly increases heat transfer and efficiency of a cooking operation when used in conjunction with dynamic, high frequency, magnetic induction field heating and cooking apparatus. The cookware reduces heat loss and allows food cooked in the cookware to stay warm after being cooked for greater periods of time, and further allows food to be maintained in a warmed condition at considerably reduced power consumption levels. Additionally, by providing attractive and decorative appearances to the design of the exterior surfaces of the thermally insulated cookware, it is further possible to employ such cookware in an outwardly visible location to add to the decor of a kitchen or other cooking areas where the cookware is to be employed.

Having described several embodiments of thermally insulated cookware constructed in accordance with the invention, it is believed obvious that other modifications and changes may be made in the particular embodiments of the invention disclosed which will be obvious to those skilled in the art in the light of the above teachings. It is therefore to be understood that any such changes and additions that are made to this invention are within the full intended scope of the invention as defined by the appended claims.

What is claimed is:

1. Insulated cookware comprising a cooking utensil formed from an inner body member of metal susceptible to being inductively heated with high frequency magnetic induction fields, and at least one exterior layer of thermal insulating material formed over substantially the entire exterior surface including the bottom of the inner body member and comprising a thermal insulating material that is substantially transparent to magnetic lines of flux and substantially blocks thermal conductivity through the layer, and a window area formed in the exterior layer of insulating material and transparent to infrared radiation whereby a portion of the inner body member of metal may be directly viewed through the window area by an infrared responsive sensing device.

2. Insulated cookware according to claim 1 wherein the inner body member is fabricated of stainless steel, iron, titanium, porcelainized iron or steel or the like.

3. Insulated cookware according to claim 2 wherein the exterior layer of insulating material is comprised of polyimid or polycarbonate plastic high temperature foam with a suitable abrasion resistant hardened high temperature outer surface of plastic, ceramic, high temperature glass or the like.

4. The insulated cookware according to claim 3 further including one or more handles secured to the cookware for facilitating its handling and the exterior insulating surface is provided with an attractive design imprinted, impregnated, molded, cut or otherwise formed on the surface.

5. Insulated cookware according to claim 4 further including a lid comprised by an inner lid member of metal that is susceptible to being inductively heated with high frequency magnetic induction fields, and at least one exterior layer of insulating material formed over substantially the entire exterior surface of the metal lid member whereby with the lid in place foods to be cooked are surrounded by substantially continuous surrounding heating metal cooking surface that is thermally insulated from the exterior.

6. The insulated cookware according to claim 5 wherein the window area is closed with an insulating material that is transparent to infrared radiation.

7. Insulated cookware comprising a cooking utensil formed from an inner body member of metal susceptible to being inductively heated with high frequency magnetic induction fields, an inner layer of compressible insulating material formed over substantially the entire exterior surface including the bottom of the inner metal body member and comprising a thermal insulating material that is substantially transparent to magnetic lines of flux and substantially blocks thermal conductivity through the layer, and an outer hard layer of thermal insulating material formed over the inner layer of compressible insulating material and comprising an insulating material that is substantially transparent to magnetic lines of flux and substantially blocks thermal conductivity through the layer.

8. Insulated cookware according to claim 7 wherein the inner body member is fabricated of stainless steel, iron, titanium, porcelainized iron or steel or the like and wherein the exterior layer of insulating material is comprised of polyimid or polycarbonate plastic high temperature foam, and the like and having a suitable hardened high temperature outer surface of plastic, ceramic, high temperature glass, or the like.

9. Insulated cookware according to claim 8 further including a lid comprised by an inner lid member of metal that is susceptible to being inductively heated with high frequency magnetic induction fields, and at least one exterior layer of insulating material formed over substantially the entire exterior surface of the metal lid member whereby with the lid in place foods to be cooked are surrounded by a substantially continuous surrounding heating metal cooking surface that is thermally insulated from the exterior.

10. Insulated cookware according to claim 9 further including a window area formed in the exterior layer of insulating material and which is transparent to infrared radiation whereby a portion of the inner body member of metal may be directly viewed through the window area by an infrared responsive sensing device.

11. Insulated cookware according to claim 10 further including one or more removable handles detachably secured to the cokkware for facilitating its handling.

12. Insulated cookware according to claim 11 wherein the exterior insulating surface is provided with an attractive design.

13. Insulated cookware according to claim 12 wherein the window area is closed with an insulating material that is transparent to infrared radiation.

* * * * *